United States Patent
Zazula et al.

(10) Patent No.: US 8,272,494 B2
(45) Date of Patent: Sep. 25, 2012

(54) CONVEYOR ASSEMBLY

(76) Inventors: Bradley Metro Zazula, Regina (CA);
Michael Ross Landry, Regina (CA);
William Lorn Dixon, Regina (CA);
Leslie Daren Scherle, Regina (CA);
Terry Douglas Houssian, Regina (CA);
Victor John Holodryga, Regina (CA)

( * ) Notice: Subject to any disclaimer, the term of this patent is extended or adjusted under 35 U.S.C. 154(b) by 137 days.

(21) Appl. No.: 12/967,271

(22) Filed: Dec. 14, 2010

(65) Prior Publication Data

US 2012/0145517 A1    Jun. 14, 2012

(51) Int. Cl.
*B65G 15/26* (2006.01)

(52) U.S. Cl. .......................... 198/313; 198/666

(58) Field of Classification Search .................. 198/312, 198/313, 315, 664, 666, 668, 317
See application file for complete search history.

(56) References Cited

U.S. PATENT DOCUMENTS

| | | | |
|---|---|---|---|
| 4,603,775 A | 8/1986 | Plett | |
| 4,963,066 A | 10/1990 | Boppart | |
| 5,184,715 A | 2/1993 | Feterl | |
| 5,305,866 A * | 4/1994 | Stewart et al. | 198/311 |
| 5,498,119 A * | 3/1996 | Faivre | 198/313 |
| 5,788,055 A | 8/1998 | Stewart et al. | |
| 6,068,103 A * | 5/2000 | Werner | 198/311 |
| 6,119,847 A * | 9/2000 | Mooney et al. | 198/313 |
| 7,191,889 B1 | 3/2007 | Heley | |
| 7,381,131 B1 | 6/2008 | Harpole | |
| 7,428,956 B2 | 9/2008 | Scherman | |
| 7,708,131 B2 * | 5/2010 | Muth | 198/315 |
| 7,866,456 B2 * | 1/2011 | Bauman et al. | 198/311 |
| 7,946,416 B2 * | 5/2011 | Grose et al. | 198/312 |

FOREIGN PATENT DOCUMENTS

| | | |
|---|---|---|
| CA | 1137915 | 12/1982 |
| CA | 2398015 | 8/2002 |
| EP | 0684198 | 5/1995 |
| WO | 2010048695 | 5/2010 |

* cited by examiner

*Primary Examiner* — James R Bidwell
(74) *Attorney, Agent, or Firm* — Ryan W. Dupuis; Kyle R. Satterthwaite; Ade & Company Inc.

(57) ABSTRACT

A conveyor assembly includes a main conveyor and a swing auger assembly pivotally coupled to an inlet end of the main conveyor for loading particulate material into the main conveyor. The swing auger assembly includes two first and second augers which are slidable relative to one another to vary a length of the swing auger assembly between a loading hopper at an inlet end of the swing auger assembly and the main conveyor connected at an outlet end of the swing auger. The swing auger assembly is suspended from an overhead support member extending upwardly from the inlet end of the main conveyor such that the swing auger assembly is pivotal through an intermediate position overtop of the main conveyor between first and second laterally offset positions on opposing sides of the main conveyor.

16 Claims, 8 Drawing Sheets

CONVEYOR ASSEMBLY

FIELD OF THE INVENTION

The present invention relates to a conveyor assembly including a main conveyor and a swing auger assembly for loading the main conveyor in which the swing auger assembly includes two auger sections which are slidable relative to one another to vary a length of the swing auger assembly and in which the swing auger assembly is suspended from an overhead support member for swinging motion overtop of the main conveyor between offset positions on opposing sides of the main conveyor.

BACKGROUND

It is common to use grain augers and the like to transfer grain or other particulate material from a source area to a target area, for example from a transport container to a bin or other storage type container. Transport containers generally involve a container supported for rolling movement along the ground by wheels spaced apart at opposing ends of the container. A hopper type discharge is then typically located between the wheels below the container for discharging into the auger which subsequently conveys the material to the storage container.

U.S. Pat. Nos. 5,184,715 to Feterl; 5,305,866 and 5,788,055 both to Stewart et al; 4,963,066 to Boppart; 4,603,775 to Plett; and 7,191,889 to Heley; and European Patent Application 0 684 198 disclose various examples of grain augers used for conveying particulate materials. In each instance a main auger is supported on a wheeled frame for positioning of the discharge in alignment with the target area. A swing auger is provided at the inlet of the main auger for alignment with the source area. The hopper at the inlet of the swing auger however is restricted to positioning along an arced path which is difficult to align with the discharge hopper of a transport container. Often due to the narrow space between wheel sets within which a discharge hopper on a transport container is located, it is not possible to displace the swing auger is an arcing motion under the transport container parked beside the main auger without multiple steps of advancing and subsequent reversal of the vehicle position for proper alignment with the discharge hopper on the vehicle with the inlet hopper on the swing auger. The swing augers are thus difficult and time consuming to set up and may result in lost material being transferred due to its poor alignment.

U.S. Pat. No. 7,428,956 by Scherman discloses an improved feed auger assembly for a conveyor including first and second auger sections which are pivotal relative to one another allowing the loading hopper to be placed through an infinite number of positions about the inlet end of the main auger; however the resulting assembly is awkwardly quite large and includes a large number of parts to control the pivoting movement of the two auger sections.

Canadian Patent 2,398,015 discloses a telescopic feed assembly using belts; however there are no means disclosed for applying a telescopic feed assembly uses augers to take advantage of the benefits of augers over belt conveyors.

International application WO2010/048695 discloses a feed auger assembly which telescopically supported in relation to an implement such as a main auger to which the feed auger is coupled; however the auger is only operable within a small portion of the full range of motion of the feed auger assembly.

Canadian Patent 1,137,915 by Togstad and U.S. Pat. No. 7,381,131 disclose examples of extendible augers. Both augers are limited in their application and are not suited for use in a swing auger assembly of an agricultural conveyor for example.

SUMMARY OF THE INVENTION

According to one aspect of the invention there is provided a conveyor assembly comprising:

a main conveyor comprising a main conveyor tube and a main conveying member in the main conveyor tube which is arranged to convey particulate material from an inlet end to an outlet end of the main conveyor tube;

a frame supporting the main conveyor tube at an upward incline from the inlet end to the outlet end in a working position of the main conveyor;

a loading hopper having a loading opening arranged to load the particulate material therein;

a swing auger assembly extending in a longitudinal direction from an inlet end in communication with the loading hopper to an outlet end in communication with the inlet end of the main conveyor;

the swing auger assembly being pivotally coupled to the main conveyor such that the swing auger is pivotal relative to the main conveyor tube about a generally upright swing axis at the inlet end of the main conveyor;

the swing auger assembly comprising:
 a first auger housing extending in the longitudinal direction of the swing auger assembly from the loading hopper at the inlet end of the swing auger assembly to a respective discharge end;
 a first screw rotatable in the first auger housing so as to be arranged to convey the particulate material from the loading hopper to the discharge end of the first auger tube;
 a second auger housing extending in the longitudinal direction of the swing auger assembly from an intermediate end to the outlet end of the swing auger assembly;
 a second screw rotatable in the second auger housing so as to be arranged to convey the particulate material through the second auger housing and to discharge the particulate material from the second auger housing into the inlet end of the main conveyor;

the first auger housing being coupled to the second auger housing such that:
 the discharge end of the first auger housing is arranged to discharge into the second auger housing; and
 the first auger housing is slidable relative to the second auger housing in the longitudinal direction such that a distance between the loading hopper and the inlet end of the main conveyor is adjustable.

The first auger housing is preferably slidable relative to the second auger housing between an extended position in which the discharge end of the first auger housing is adjacent an inner end of the second auger housing and a retracted position in which the discharge end of the first auger housing is adjacent the outlet end of the auger assembly.

Preferably the discharge end of the first auger housing is arranged to discharge into the second auger housing through a full range of relative motion of the auger housings between the extended and retracted positions.

The second auger housing may comprise a lower portion forming a generally U-shaped trough receiving the second screw therein and an upper portion comprising a pair of side walls extending upwardly from opposing sides of the lower portion to define an open top end of the second auger housing between the side walls.

The side walls forming the upper portion may be spaced apart farther than the trough of the lower portion.

Preferably each side wall supports a track along which a portion of the discharge end of the first auger housing is supported for relative sliding in the longitudinal direction.

The second auger housing may include a support member fixed at an inner end opposite the outlet end which extends upwardly above the second screw in which the first auger housing is slidably supported on the support member at an intermediate location along the first auger housing between the inlet end of the swing auger assembly and the discharge end of the first auger housing.

Preferably a linear actuator is coupled between the first and second auger housings so as to be arranged to control relative sliding movement between the first and second auger housings in which the actuator is supported laterally between opposing sides of the upper portion of the second auger housing alongside a top end of one of the side walls.

The loading hopper is preferably fixed in relation to the first auger housing so as to be arranged for sliding movement therewith relative to the second auger housing.

Preferably a swing auger gearbox assembly is supported at the outlet end of the swing auger assembly in which the swing auger gearbox assembly includes a first output shaft telescopically joined with the first screw for relative sliding movement in the longitudinal direction while being rotatable together about a first rotation axis of the first screw, and a second output shaft fixed to the second screw for rotation therewith about a second rotation axis parallel to the first rotation axis.

The main conveyor preferably includes a pair of support legs and a linkage coupling the support legs to the main conveyor such that the support legs are operable between a working position extending downwardly and outwardly in opposing lateral direction from the main conveyor tube for supportably engaging the ground and a transport position extending substantially alongside the main conveyor tube.

The linkage supporting the support legs preferably comprises: a slide member supported on the main conveyor tube for sliding movement in a longitudinal direction of the main conveyor tube, the slide member pivotally coupling an inner end of each of the support legs thereon; a pair of link members each pivotally coupled at a first end at an intermediate location on a respective one of the support legs and pivotally coupled at a second end at an anchoring location fixed relative to the main conveyor tube; and a linear actuator controlling relative sliding movement of the slide member between the transport position spaced from the anchoring location of the link members and the working position in which the slide member is nearer to the anchoring location than in the transport position.

The conveyor assembly preferably further comprises: a swing auger support member supported above the inlet end of the main conveyor; a pivot member supported on the swing auger support member at a location spaced above the outlet end of the swing auger assembly for pivotal movement relative to swing auger support member about the swing axis; and a suspension arm suspending the swing auger assembly from the pivot member for pivotal movement together with the pivot member about the swing axis.

Preferably the swing auger support member supports the swing auger assembly for pivotal movement about the swing axis through an intermediate position overtop of the main conveyor between a first offset position in which the swing auger assembly extends outwardly from one side of the main conveyor in a first lateral direction and a second offset position in which the swing auger assembly extend outwardly from the other side of the main conveyor in a second lateral direction opposite to the first lateral direction.

Preferably the swing auger assembly extends from the discharge end at the inlet end of the main conveyor to the loading hopper towards the outlet end of the main conveyor in the intermediate position.

According to a second aspect of the present invention there is provided an agricultural conveyor assembly comprising:

a main conveyor comprising a main conveyor tube and a main conveying member in the main conveyor tube which is arranged to convey particulate material from an inlet end to an outlet end of the main conveyor tube;

a frame supporting the main conveyor tube at an upward incline from the inlet end to the outlet end in a working position of the main conveyor;

a loading hopper having a loading opening arranged to load the particulate material therein;

a swing auger assembly extending in a longitudinal direction from an inlet end in communication with the loading hopper so as to be arranged to receive the loaded particulate material from the loading hopper to an outlet end in communication with the inlet end of the main conveyor so as to be arranged to discharge the loaded particulate material into the inlet end of the main conveyor;

the swing auger assembly being pivotally coupled to the main conveyor such that the swing auger is pivotal relative to the main conveyor tube about a generally upright swing axis at the inlet end of the main conveyor;

a swing auger support member supported above the inlet end of the main conveyor;

a pivot member supported on the swing auger support member at a location spaced above the outlet end of the swing auger assembly for pivotal movement relative to swing auger support member about the swing axis; and a suspension arm suspending the swing auger assembly from the pivot member for pivotal movement together with the pivot member about the swing axis.

Preferably the swing auger support member is arranged to be fixed relative to the main conveyor tube.

The swing auger support member preferably supports the pivot member on the swing axis.

When the swing auger support member extends upwardly from the main conveyor tube, the outlet end of the swing auger assembly is preferably pivotally coupled to the main conveyor at a location spaced inwardly from the swing auger support member towards the outlet end of the main conveyor tube.

The swing auger support member preferably comprises a lower portion extending upwardly from the conveyor tube spaced forwardly from the swing axis and an upper portion spaced above the discharge end of the swing auger assembly which extends rearwardly from the lower portion towards the outlet end of the main conveyor such that the upper portion supports the pivot member thereon at the swing axis.

The suspension arm preferably comprises a linear hydraulic lift actuator arranged to controllably vary a height of the inlet end of the swing auger assembly as a length of the actuator is adjusted in response to a hydraulic input.

When the swing auger assembly comprises a first auger housing and a second auger housing coupled for relative sliding movement in the longitudinal direction to vary a length of the swing auger assembly, the suspension arm is preferably coupled at one end to the pivot member and at the other end to the second auger housing nearer to an inner end opposite the outlet end than the outlet end of the swing auger assembly.

According to a further aspect of the present invention there is provided an agricultural conveyor assembly comprising:

a main conveyor comprising a main conveyor tube and a main conveying member in the main conveyor tube which is arranged to convey particulate material from an inlet end to an outlet end of the main conveyor tube;

a frame supporting the main conveyor tube at an upward incline from the inlet end to the outlet end in a working position of the main conveyor;

a loading hopper having a loading opening arranged to load the particulate material therein;

a swing auger assembly extending in a longitudinal direction from an inlet end in communication with the loading hopper so as to be arranged to receive the loaded particulate material from the loading hopper to an outlet end in communication with the inlet end of the main conveyor so as to be arranged to discharge the loaded particulate material into the inlet end of the main conveyor;

the swing auger assembly being pivotally coupled to the main conveyor such that the swing auger is pivotal relative to the main conveyor tube about a generally upright swing axis at the inlet end of the main conveyor;

a swing auger support member supporting the swing auger assembly for pivotal movement about the swing axis through an intermediate position overtop of the main conveyor between a first offset position in which the swing auger assembly extends outwardly from one side of the main conveyor in a first lateral direction and a second offset position in which the swing auger assembly extend outwardly from the other side of the main conveyor in a second lateral direction opposite to the first lateral direction;

the swing auger assembly extending from the discharge end at the inlet end of the main conveyor to the loading hopper towards the outlet end of the main conveyor in the intermediate position.

The swing auger assembly is preferably arranged to be supported alongside top of main conveyor in the intermediate position such that longitudinal axes are substantially in common vertical plane.

When the main conveyor comprising a hitch connector extending forwardly outward from the inlet end of the main conveyor opposite the outlet end of the main conveyer, there may be provided a stop member arranged to prevent pivotal movement of the swing auger assembly across the hitch connector between the first and second offset positions.

When the main conveyor tube includes an inlet opening arranged to receive the particulate material from the swing auger assembly therethrough at the inlet end of the main conveyor tube, the swing auger assembly preferably includes: an annular driven member supported about the inlet opening for rotation relative to the main conveyor about the swing axis together with the swing auger assembly; and a swing drive motor coupled to the annular driven member so as to be arranged to rotate the annular driven and the swing auger assembly therewith about the swing axis.

The swing drive motor is preferably supported on the main conveyor spaced radially outward from the annular driven member in relation to the swing axis, and the annular driven member preferably comprises a circumferential gear operatively connected to swing drive motor.

When there is an inlet housing supported at the inlet end of the main conveyor having a top wall locating the inlet opening therein at swing axis, the annular driven member is preferably supported within the inlet housing under the top wall of the inlet housing.

The swing auger assembly preferably includes a pair of auger mounts extending upwardly from annular driven member at diametrically opposing sides of the inlet opening in which the auger mounts pivotally couple the discharge end of the swing auger assembly thereon for relative pivotal movement about a substantially horizontal axis.

As described herein the swing auger assembly or feed auger system according to the present invention can raise and lower without the use of a mechanical winch device, cables, and manual labour. This motion can be achieved with the use of a hydraulic cylinder connected to the swing tube assembly housing at one end, and the overhead structure assembly mounted to the upper section of the boot assembly drive area at the opposite end. Left and right swing motion of the feed auger system can be controlled with a hydraulic motor, and chain system mounted internally to the boot assembly drive area and the lower pivot ring assembly, eliminating end user push/pull labour, and pinch points. The extension and retraction motion (or telescoping motion) of the feed auger tube assembly can be accomplished with a hydraulic cylinder mounted internally to the lower fixed feed tube assembly at one end and the lower section of the tube assembly in motion. This motion can allow the end user to quickly align the feed auger hopper to the point of loading as required. All motions detailed above can be controlled with a remote electronic device to allow more freedom of movement for the operator of the equipment.

When combined, the motions explained herein can allow for a left or right hand loading option without the requirement of the end user relocating, adjusting, or reconfiguring mounts, chains, pins, winches, guards, and other associated assemblies. This can allow the auger assembly as a whole to be located and operated quickly, as well as accommodate tandem unloading of trailers from either side of the auger. The extension and retraction of the feed auger system design is unique to the conveyor described herein because it can allow the operator to load the auger at any positional length of the designed stroke. Also, the extension and retraction can allow the operator to align the hopper to the point of loading quicker. Finally, when in transport, all motions combined can allow the parking of the feed auger system to be located on top of the main auger tube assembly, reducing side load stresses on the main auger frames and tube.

Unique features of the present invention preferably include the following:

i) The swing stores on top of the auger thus eliminating twist on the main tube, and allowing the swing to be pivoted to either side. Other swings now store on one side of the main tube and can only pivot to that side, without disconnecting the tractor and rotating the swing in a 300 degree arc around the hitch to the opposite side.

ii) The swing tube is lifted with one hydraulic cylinder from a tower at the hitch end of the device beyond the pivot. Others use a cable hoist to lift the swing tube.

iii) An adjustable stop is installed at the upper cylinder pivot to prevent the swing from hitting the tractor while pivoting.

iv) The upper cylinder pivot is mounted directly in line above the feed pivot to eliminate any bending moment at the feed pivot, for smooth rotation and less wear.

v) The pivot runs of a polymer bushing, and is rotated using a hydraulic motor connected to a spur gear driving a circumferential gear on the swing pivot. Others rotate the swing using hydraulic motors mounted either on the swing tube or on the hopper.

vi) A longer boot is provided, fed from the front, to improve capacity. Others use a shorter boot fed from the rear.

vii) Hydraulic hoses are mounted inside the device to eliminate pinching, severing, weathering and wear. Others have hydraulic hoses mounted outboard.

viii) Outriggers are activated by a single hydraulic cylinder with pivot arms forcing the outriggers apart and down. Others use one cylinder on each outrigger.

ix) Swing auger has telescoping motion by the use of a hydraulic cylinder mounted internally to the lower fixed tube assembly at one end and the lower section of the tube assembly in motion. No other competitor's auger swing offers this feature. This allows accurate positioning of the hopper under the truck.

x) Entire tower assembly pivots with the ring assembly on top of the boot, thus allowing sufficient movement to relocate the hopper to various positions under the truck.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a conveyor assembly generally indicated by reference numeral 10. The assembly 10 is suited for use as an agricultural auger for conveying particulate material, for example grain, seed or other similarly particulate materials.

The assembly 10 includes a main conveyor 12 comprised of a main conveyor tube 14 which is elongate in a respective longitudinal direction between an inlet end 16 and an outlet end 18. A main conveying member within the main conveyor tube 14 comprises an auger (not shown) in the illustrated embodiment which is rotatable about a longitudinal axis thereof to convey the particulate material from the inlet end to the outlet end.

The main conveyor also comprises a frame 20 which supports the main conveyor tube 14 on wheels 22 for rolling movement generally in the longitudinal direction of the conveyor. The frame comprises an adjustable linkage which supports the main conveyor through a range of movement between a working position extending at an upward incline from the inlet end adjacent the ground to the outlet end spaced upwardly and rearwardly therefrom and a transport position in which the main conveyor tube is nearer to horizontal than the working position. The main conveyor is shown in the transport position in FIG. 1, and in the working position in FIGS. 4 and 5. The frame further comprises an auxiliary support 24 comprising a central post and a plurality of cables connected between the post and the various longitudinal positions along the conveyor tube to stiffen the tube and resist bending along the length thereof.

The main conveyor further comprises a hitch connection 26 coupled to the main conveyor tube adjacent the inlet end thereof such that the hitch connection extends forwardly beyond the inlet end. The hitch connection permits the connection of the inlet end of the main conveyor tube to a towing vehicle such that the vehicle can be towed in the normal forward working direction of the vehicle with the main conveyor tube extending rearwardly from the inlet end to the outlet end trailing rearwardly therefrom.

The conveyor assembly 10 further comprises a swing auger assembly 28 coupled to the inlet end of the main conveyor tube to assist in loading particulate material into the main conveyor. The swing auger assembly serves to convey material from an inlet end 30 thereof to a respective outlet end 32 arranged to discharge particulate material loaded therein into the inlet end of the main conveyor. The swing auger assembly is pivotal about an upright swing axis at the inlet end of the main conveyor tube.

A loading hopper 34 is provided for loading the particulate material into the inlet end of the swing auger assembly. The hopper 34 is fixed to the inlet end of the swing auger assembly for movement therewith about the upright swing axis. The hopper is similar to many convention swing auger hoppers so as to be both wider and longer than it is in height and so as to be relatively low in profile for being received under the discharge of various implements such as the discharge chute under particulate material carrying trailers for example. The hopper includes an open top end spanning substantially the full width and length of the hopper into which particulate material is arranged to be received. A suitable conveying mechanism at the bottom end of the hopper conveys the loaded particulate material through a discharge tube 36 connected to the inlet end of the swing auger assembly to which it is coupled. The material is then conveyed in the longitudinal direction of the swing auger assembly from the inlet end to the outlet end prior to the loading into the main conveyor tube.

The main conveyor tube is provided with an inlet housing 38 at the inlet end thereof for supporting the swing auger assembly 28 pivotally thereon. The inlet housing 38 substantially surrounds the inlet end of the main conveyor tube and comprises two side walls 40 extending upwardly above the tube at opposing sides thereof to define a receiving chamber above the tube in open communication with the conveying member rotatable within the tube 14. A top wall 42 of the inlet housing is connected between the two side walls spaced above the tube for locating an inlet opening 44 therein adjacent the inner end of the inlet housing so as to be spaced rearwardly from the front end of the housing and conveyor tube.

A main drive 46 is mounted at the inlet end of the conveyor tube and inlet housing for receiving a drive input, for example connection to a power take off shaft of a tractor or a hydraulic output of a tractor. The main drive 46 includes a first output shaft 48 concentric with the main conveyor tube for direct connection to the main conveying member rotatable therein for driving the main conveyor screws. The main drive also includes a second output shaft 50 which is parallel and spaced above the first output shaft to extend rearwardly through the receiving chamber of the inlet housing for driving the auger screws of the swing auger assembly as described in further detail below. The inlet housing 38 also receives a first angle gear box 52 therein which receives the second output shaft of the main drive as an input therein and which has a respective output shaft concentric with the inlet opening 44 in the top wall of the inlet housing through which the output shaft communicates to the swing auger assembly.

The swing auger assembly is supported on a swing auger support member 54 in the form of a tower structure fixed to the inlet end of the main conveyor tube to extend upwardly from the inlet housing upon which it is mounted. The support member 54 is a rigid frame member having a lower portion 56 extending upwardly from the inlet housing on the inlet end of the main conveyor tube at a location spaced forwardly of the inlet opening so as to extend generally in the direction of the upright swing axis towards an upper portion 58 thereabove. The upper portion 58 extends upwardly from the lower portion at a rearward incline spaced above the outlet end of the swing auger assembly to extend towards the outlet end of the main conveyor tube. The top end of the upper portion 58 is located at the swing axis as opposed to the lower portion which remains spaced from the swing axis along the length thereof.

A pivot member 60 is rotatably supported adjacent the top end of the upper portion so as to be rotatable relative to the fixed support member 54 about the swing axis. The top end of the upper portion of the support member 54 includes an overhanging portion at the swing axis to which the pivot member is coupled such that the pivot member is supported beneath the overhang portion to permit ready coupling of the pivot member 60 to the swing auger assembly therebelow. In this manner the swing auger assembly can be suspended from the pivot member so that the swing auger assembly and the pivot member are pivotal together about the upright swing axis relative to the support member 54 fixed on the main conveyor tube.

A suspension arm 62 in the form of an adjustable hydraulic actuator is pivotally coupled at a cylinder end to the pivot member at the pivot axis while being coupled at a cylinder end to the swing auger assembly at a location spaced from the swing axis. In this manner, controllably adjusting the length of the actuator forming the suspension arm 62 functions to raise and lower the height of the loading hopper at the inlet end of the swing auger assembly relative to the main conveyor tube.

The swing auger assembly is supported on the inlet housing by an annular driven member 64. The annular driven member is supported about the inlet opening on the top wall so as to be concentric with the swing axis for rotation with the swing auger assembly relative to the top wall of the inlet housing on the conveyor tube. More particularly the annular driven member 64 comprises a circumferential gear 66 supported within the interior of the inlet housing so as to be beneath the top wall. The gear 66 is coupled to a pivot ring 68 above the top wall which includes a peripheral flange overlapping the edge of the inlet opening in the top wall. A collar extending through the inlet opening joins the pivot ring 68 above the top wall and the gear 66 below the top wall for rotation together about the swing axis.

The pivot ring 68 supports two pivot mounts 70 thereon at diametrically opposed sides of the inlet opening. The two mounts extend upwardly for pivotally coupling a discharge housing 72 of the swing auger assembly therebetween for relative pivotal movement about a common horizontal axis extending between the two pivot mounts. The swing auger assembly is pivoted about the common horizontal axis of the two pivot mounts 70 as the height of the loading hopper is adjusted by extending and retracting the hydraulic actuator forming the suspension arm 62.

The rotation of the swing auger assembly about the swing axis is driven by a swing drive motor 74 comprising a hydraulic orbit motor mounted on the top wall of the inlet housing at a location spaced forwardly of the inlet opening adjacent the bottom end of the auger support member 54. The motor 74 is thus spaced radially outward from the annular driven member about the inlet opening in relation to the swing axis.

The motor 74 is typically mounted externally on the top side of the inlet housing with an output shaft extending through the top wall for connection to a drive sprocket 76 mounted internally within the inlet housing. A suitable drive chain 78 extends about the drive sprocket 76 and the circumferential gear 66 of the annular driven member so that the output of the swing drive motor controls the rotation of the annular driven member about the swing axis which in turn controls the swinging of the swing auger assembly connected thereto for pivotal movement about the swing axis relative to the main conveyor tube.

Figure 3:
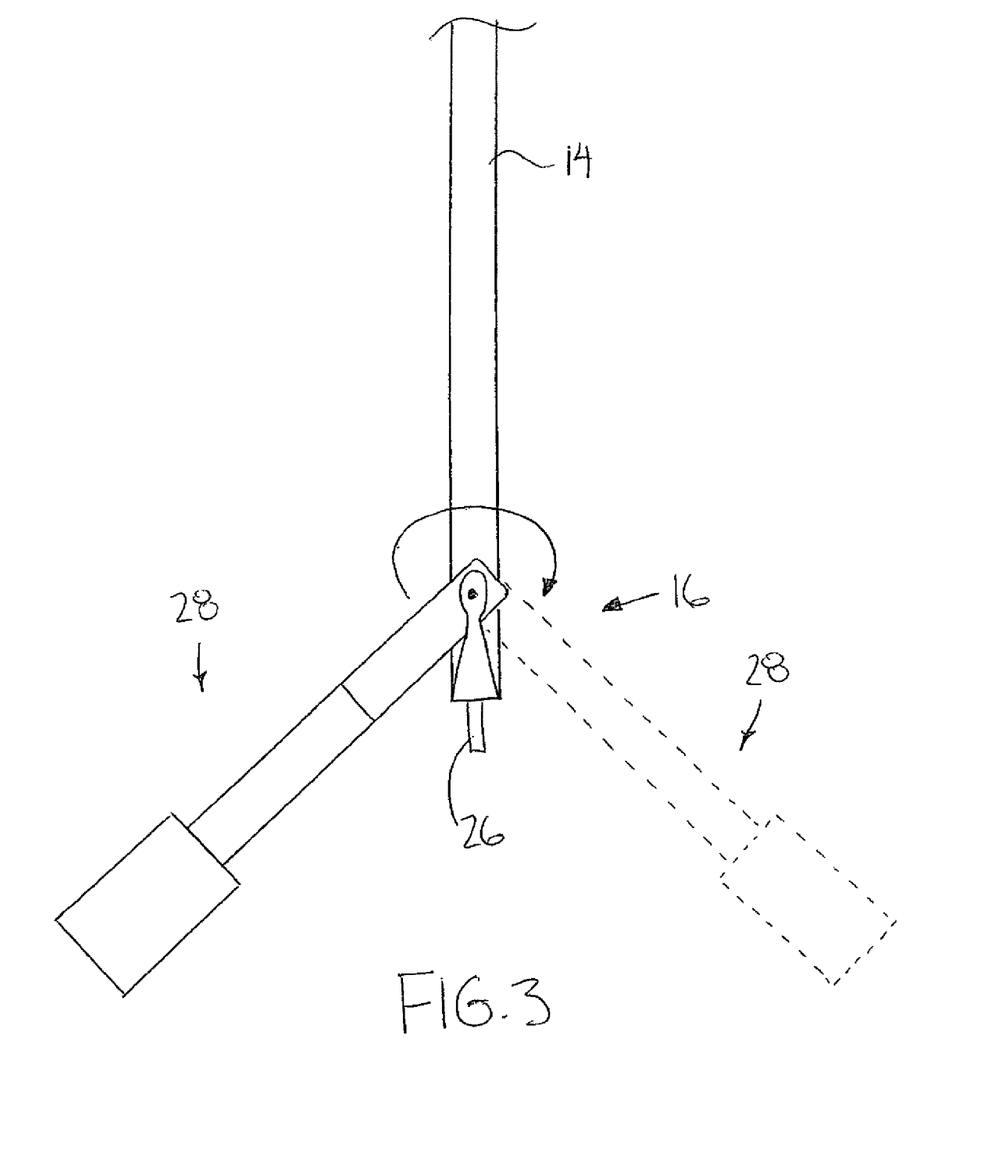
FIG. 3 is a top plan view of the swing auger assembly in a first offset position in solid line and in a second offset position in broken line.

The swing auger assembly is pivotal through a range, typically corresponding to approximately 300° from a first offset position shown in solid line in FIG. 3 to an opposing second offset position shown in broken line in FIG. 3. In the first offset position, the swing auger assembly extends outwardly from one side of the main conveyor in a first lateral direction inclined forwardly. From the first offset position the swing auger assembly is pivotal rearwardly towards the outlet end of the main conveyor tube to an intermediate position overtop of the main conveyor in which the swing auger assembly is along the top side of main conveyor such that a longitudinal axis of the swing auger assembly and a longitudinal axis of the main auger lie in a substantially common vertical plane.

The swing auger assembly can continue to swing overtop of the main conveyor tube to the opposing side to the second offset position in which the swing auger assembly extends outwardly from the other side of the main conveyor in a second lateral direction opposite to the first lateral direction. The swing auger assembly is also inclined forwardly in the second offset position. In this manner the swing auger assembly can be pivoted between the first and second offset positions overtop of the main conveyor tube while the main conveyor tube remains connected at the hitch connection to the towing vehicle. This is particularly advantageous when it is desirable to unload particulate material from two different sources into the swing auger assembly when the two sources are on opposing sides of the main conveyor tube and the towing vehicle remains connected to the hitch connection of the main conveyor.

Due to the location of the auger support member 54 at the inlet end of the main conveyor and the location of the pivotal connection of the swing auger assembly at the swing axis being spaced rearwardly from the support member, the support member effectively acts as a stop which prevents swinging motion of the swing auger assembly across the hitch connection between the first and second offset positions.

To further limit the pivotal movement of the swing auger assembly across the hitch connection to prevent damaging contact with a towing vehicle an adjustable stop 80 is coupled to the pivot member. The stop 80 comprises a protrusion projecting radially outward from the swing axis which is arranged to engage the upper portion of the support member 54 when the swing auger assembly reaches either one of the first or second offset positions to limit forward rotation of the swing auger assembly from either one of the offset positions. Accordingly only rearward pivotal movement from either of the offset positions is permitted to limit the swinging motion across the main conveyor tube. The orientation of the stop 80 can be varied relative to the pivot member to allow setting different limits to the range of pivotal movement of the swinging auger assembly depending upon the configuration.

When displacing the swing auger assembly about the swing axis, it is desirable to stabilize the inlet end of the main conveyor tube. This is accomplished using outriggers comprising a pair of support legs 82 which are coupled by a linkage to the main conveyor such that the legs are operable between a working position extending downwardly and outwardly in opposing lateral directions from the main conveyor tube for supportably engaging the ground, and a transport position extending substantially along the bottom side of the main conveyor tube.

The linkage includes a slide member 84 supported for sliding movement in the longitudinal direction along the bottom side of the main conveyor tube adjacent the inlet end. The inner ends of each support leg 82 are pivotally coupled to the slide member 84. The linkage further includes two link members 86 in which each link member is pivotally coupled at a first end at an intermediate location on a respective one of support legs 82 and at a second end at an anchoring location on the bottom side of the main conveyor tube at a fixed location spaced from the slide member. In this manner sliding of the slide member towards and away from the anchoring location of the link members causes the support legs to be displaced between the working and the transport positions noted above. A single linear hydraulic actuator 88 is coupled along the bottom side of the conveyor tube to be fixed to the conveyor tube at a cylinder end and to be coupled to the slide member at a piston end. Accordingly extending and retracting the single actuator 88 causes both support legs 82 to be controllably displaced between the working and transport positions.

The swing auger assembly 28 comprises a first auger housing 90 extending in the longitudinal direction of the auger assembly between a first end forming the inlet end of the assembly and a second end forming an intermediate discharge end 92. The first auger housing is generally tubular between the inlet end fixed to the discharge tube of the loading hopper and a respective discharge spout 94 for discharging into a second auger housing 96. A first auger screw is rotatable about the longitudinal axis thereof within the first auger housing for conveying particulate material loaded in the loading hopper to the discharge spout 94 for discharging into the second auger housing 96.

The second auger housing 96 of the swing auger assembly also extends in the longitudinal direction from a first end comprising an intermediate inner end 98 to a second opposing end defining the outlet end of the swing auger assembly. The first and second auger housings are coupled such that the first housing extends parallel along the top of the second auger housing with the discharge of the first auger housing being aligned with an open top end of the second auger housing through a full range of relative sliding movement between the first and second housings in the longitudinal direction.

The relative sliding between the first and second housings permits the overall length of the swing auger assembly to be varied by varying the distance between the inlet end supporting the loading hopper thereon and the outlet end supported on the inlet end of the main conveyor. The first and second auger housings are supported for relative sliding movement between an extended position shown in FIG. 5 in which the discharge end of the first auger housing is adjacent the inner end 98 of the second auger housing and a retracted position shown in FIG. 4 in which the discharge end of the first auger housing is adjacent the outlet end of the second auger housing.

The second auger housing includes a lower portion which forms a generally U shaped trough having a bottom and two sides extending in the longitudinal direction for closely fitting a second auger screw 100 rotatably therein about a respective longitudinal axis. The second auger screw 100 conveys the particulate material discharged into the second auger housing from the first auger housing from the discharge spout 94 to the discharge housing 72 of the assembly.

In addition to the lower portion 102, the second auger housing includes an upper portion 104 comprising two opposed side walls extending upward and outwardly from the two sides of the trough forming the lower portion such that the upper portion is wider than the lower portion. The first auger housing is supported to be located recessed partly into the upper portion 104 of the second auger housing.

More particularly the second auger housing includes a track 106 along the inner side of each side wall of the upper portion 104 such that the discharge spout 94 at the discharge end of the first auger housing is supported at opposing sides in respective ones of the tracks 106 by respective rollers supported for rotation within the tracks.

Further support is provided at an intermediate location along the first auger housing by an inner end wall 108 of the second auger housing which encloses the inner end of the lower trough portion and which extends upwardly above the upper portion 104 to locate an aperture 110 therein which slidably receives the round tube of the first auger housing therethrough.

The second auger housing also includes a cover member 112 in the form of a rigid arch extending overtop the first auger housing and which is rigidly joined between the two side walls of the upper portion 104 adjacent the inner end of the second housing. The cover member 112 serves as an anchoring location for the suspension arm 62 such that the piston end of the suspension arm is pivotally coupled to the cover member of the second auger housing at a location nearer to the inner end of the second auger housing than the outlet end thereof.

The outlet end of the second auger housing is connected to the discharge housing 72 so that the outlet end of the lower trough portion openly communicates through the interior of the discharge housing so that particulate material conveyed by the second auger screw is discharged through the discharge housing to a bottom opening of the discharge housing forming a chute aligned with the inlet opening between the two pivot mounts upon which the discharge housing 72 is supported. In this manner the particulate material from the loading hopper is conveyed into the first auger housing which in turn conveys the particulate material to the discharge spout 94 having an open bottom end aligned with the open top end of the trough through the full range of relative motion therebetween. Regardless of the location of where the particulate material is discharged from the first auger housing to the second auger housing, the rotation of the second auger screw conveys the particulate material to the discharge housing 72 at the outlet end of the swing auger assembly to discharge the material into the inlet opening of the inlet housing which in turn communicates with the main conveying member of the main conveying tube to convey the material through the main conveyor to the outlet end thereof.

The augers in the swing auger assembly are driven by a swing auger gear box assembly which includes a second angle gear box 114 mounted within the interior of the discharge housing 72 and an external gear box 116 mounted externally at the outlet end of the swing auger assembly. The second angle gear box 114 includes an input shaft concentric with the discharge opening through the bottom of the discharge opening 72 which is in turn arranged to be concentric with the output shaft of the first angle gear box extending through the inlet opening when the swing auger assembly is in a normal working position with the loading hopper on the ground.

One output of the second angle gear box 114 extends externally through the end wall of the discharge housing 72 for communication into the external gear box 116 which transfers the drive to a first output shaft 118 of the swing auger gear box assembly. The first output shaft is slidably and telescopically received into the first auger screw at the rotation axis thereof such that the first auger screw and the output shaft are slidable relative to one another between the extended and retracted positions of the swing auger assembly while remaining keyed to rotate with one another by mating non circular cross sections.

Another output of the second angle gear box 114 defines a second output shaft 120 of the swing auger gear box assembly which is directly connected to the second auger screw for driving the rotation thereof together with the first auger screw. In this manner, the drive for the swing auger assembly is communicated by the upper output shaft of the main gear box at the end of the main conveyor tube through the inlet housing to the first angled gear box which then communicates through the inlet opening to the second angle gear box in the discharge housing 72. The second angle gear box then communicates a first rotation through the external gear box and through the telescoping first output shaft 118 to drive the first auger screw while simultaneously driving the second output shaft 120. Rotation of the first auger screw can also be connected by suitable drive connections through the discharge tube of the loading hopper to a suitable conveying mechanism in the loading hopper for conveying the particulate material into the swing auger assembly.

The sliding movement of the first auger housing relative to the second auger housing together with the hopper fixed to the first auger housing is controlled by a respective hydraulic linear actuator 122 mounted on the second auger housing and operatively connected to the first auger housing. The actuator 122 is supported to extend in the longitudinal direction alongside the top end of one of the side walls of the upper portion 104 at a location in the lateral direction which is between the two side walls. A cylinder end of the actuator 122 is fixed to the second auger housing adjacent the discharge housing at the outlet end thereof while the piston end extends through the end wall of the second auger housing at the inner end thereof for connection to the first auger housing adjacent the loading hopper at the inlet end thereof. The piston end of the cylinder is substantially enclosed by the cover member 112 of the second auger housing through which the piston end is received. The piston end is slidable through a respective aperture in the end wall such that the actuator can be freely extended and retracted to vary the distance between the loading hopper and the outlet end of the swing auger assembly.

Figure 1:
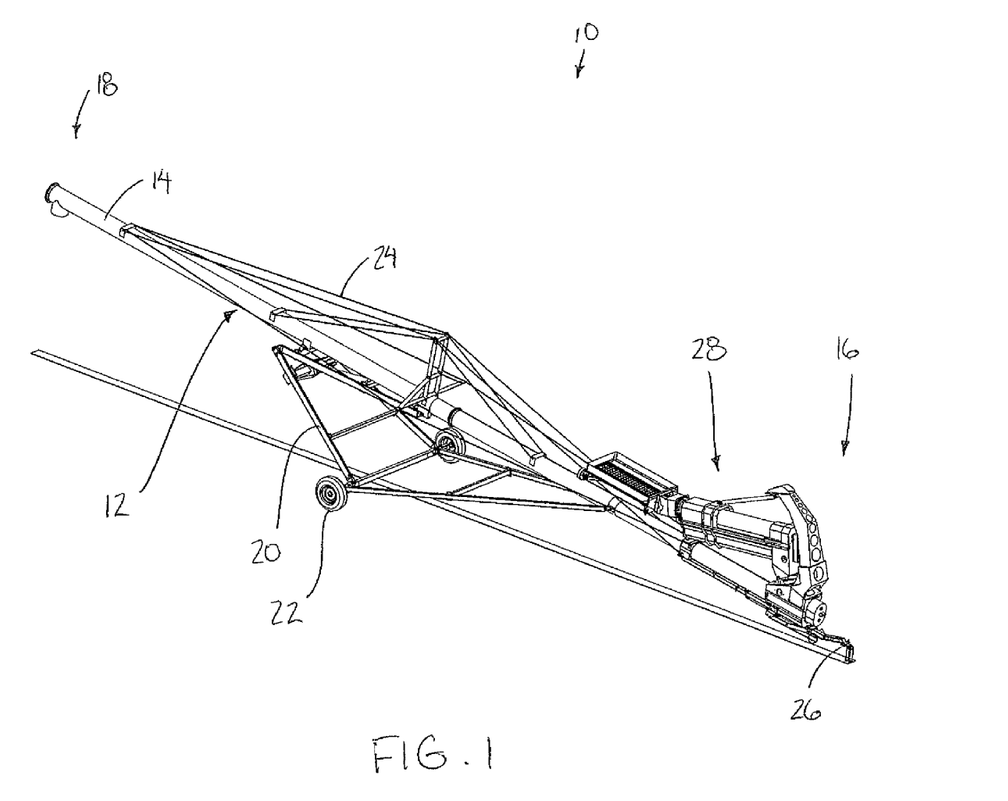
FIG. 1 is a perspective view of the conveyor assembly.
Figure 2:
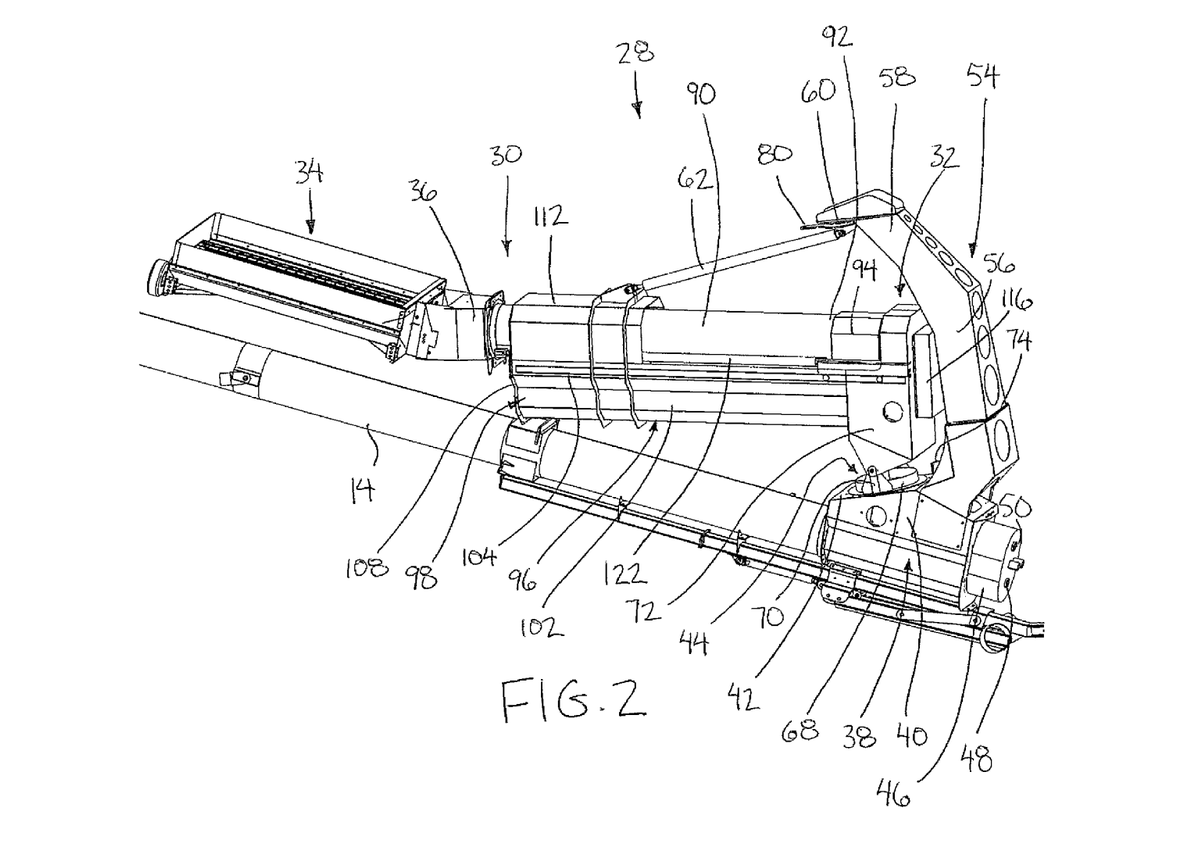
FIG. 2 is an enlarged perspective view of the swing auger assembly of the conveyor assembly.

As shown in the transport position of FIG. 1, the swing auger assembly can be stored in the intermediate position for transport by extending along the top side the main conveyor tube from the inlet end of the conveyor tube to the loading hopper which extends toward the outlet end of the main conveyor tube. In this manner the weight of the swing auger assembly is balanced about the longitudinal axis of the main conveyor tube so that there is no torque being applied to the conveyor tube with the swing auger assembly stored in the intermediate transport position.

Figure 4:
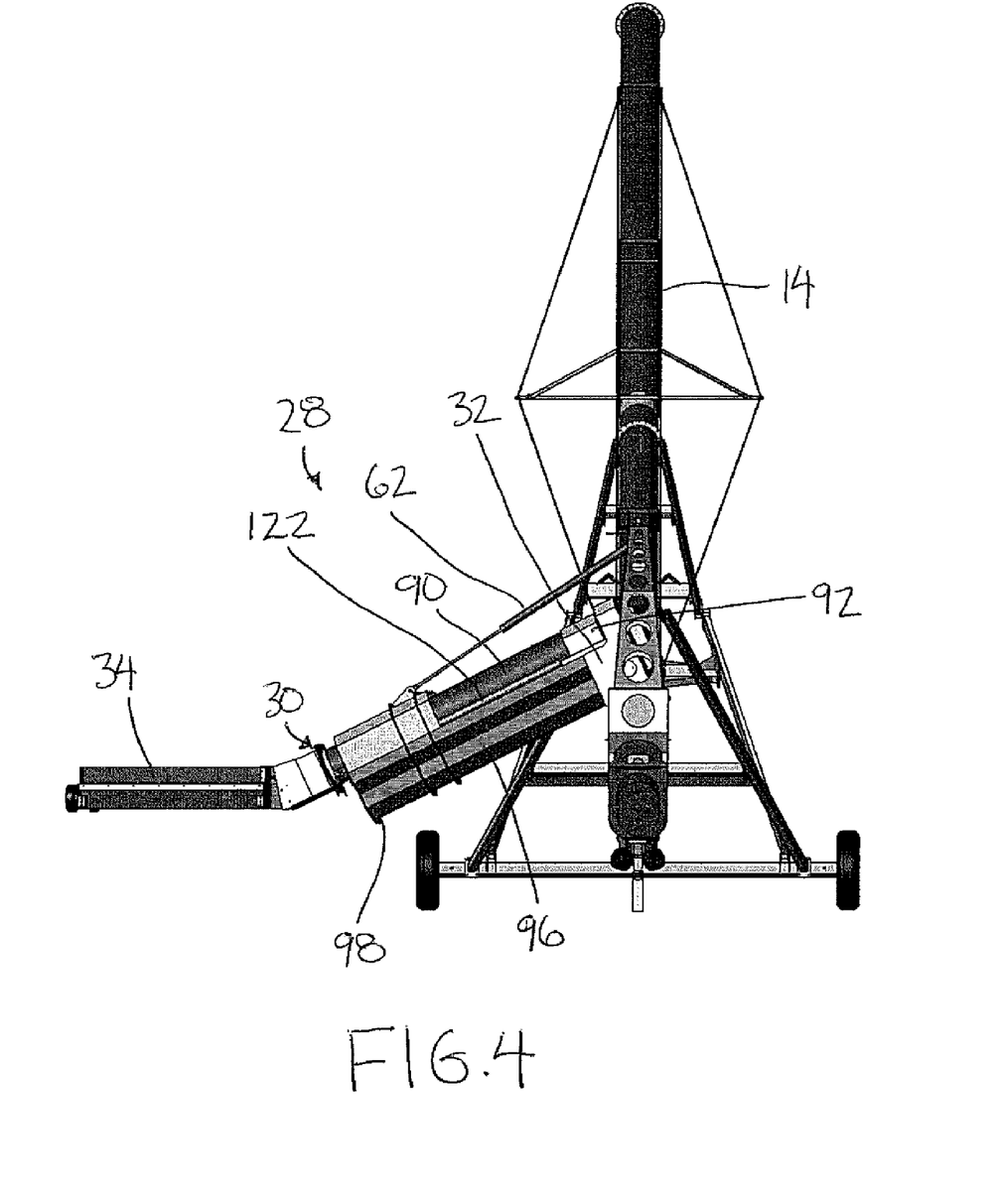
FIG. 4 is a front elevational view of the conveyor assembly with the swing auger assembly shown offset to one side in the retracted position.
Figure 5:
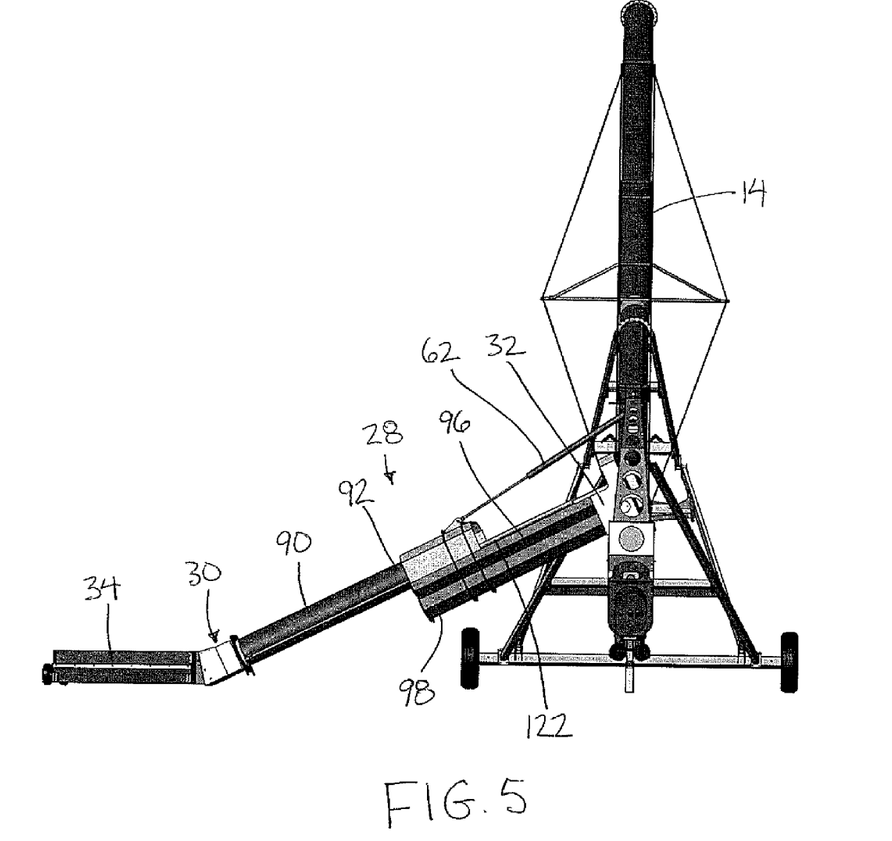
FIG. 5 is a front elevational view similar to FIG. 4, but with the swing auger assembly in an extended position.
Figure 6:
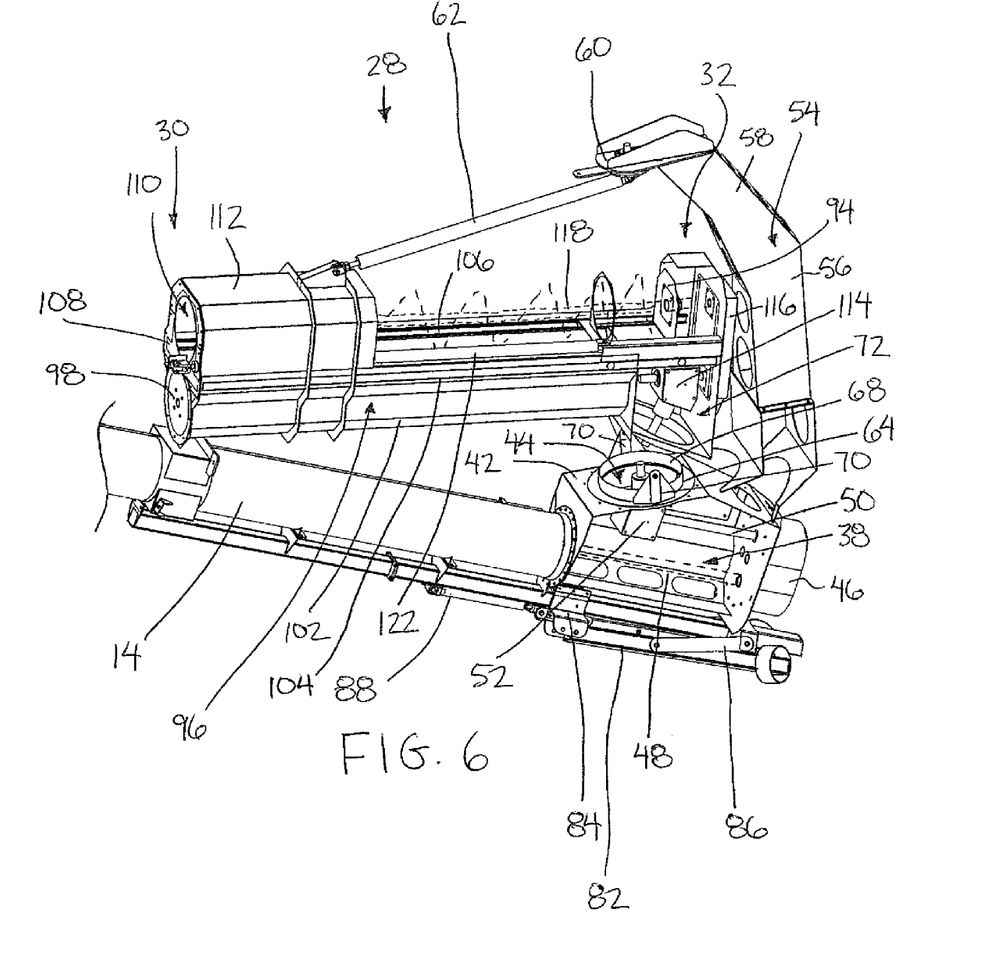
FIG. 6 is a perspective view of the swing auger assembly in which some of the side walls are shown removed.
Figure 7:
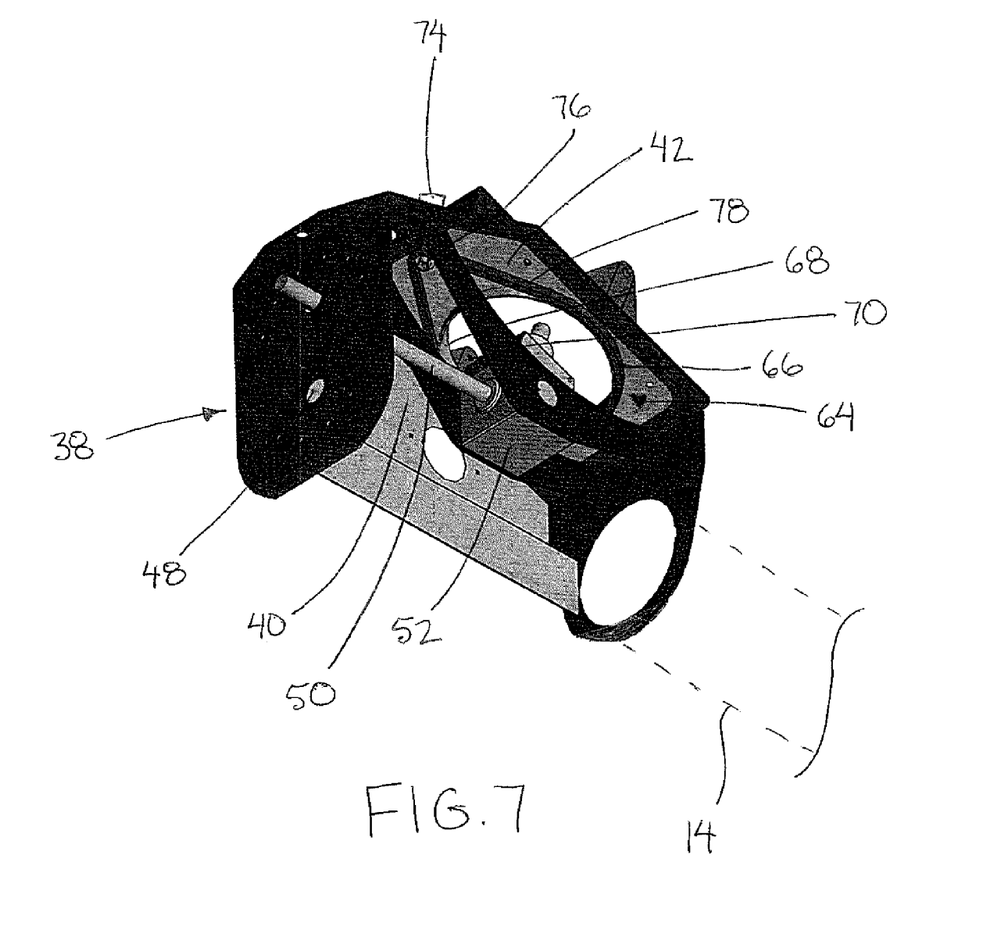
FIG. 7 is a perspective view of the inlet housing with some of the walls shown removed to illustrate the internal components of the swing drive.
Figure 8:
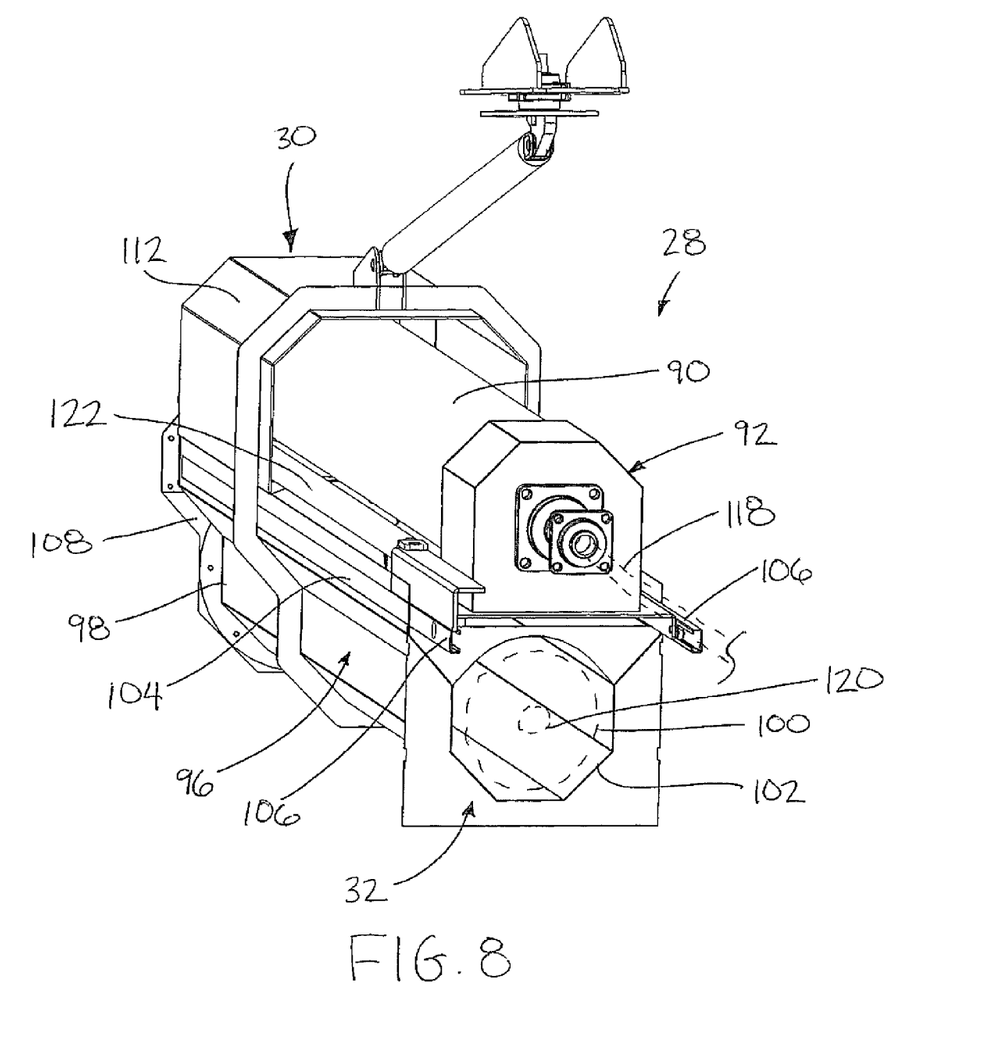
FIG. 8 is a perspective view showing the discharge end of the second housing auger.

For use of the conveyor assembly, the main conveyor is displaced using the frame upon which it is supported into the working position with the two support legs being also extended into the working position to stabilize the inlet end thereof. The swing drive is used to pivot the swing auger assembly to one side of the main conveyor. Using the lift cylinder forming the suspension arm 62, the extension thereof causes the loading hopper to be lowered towards the ground and towards a working position. Wheels at the end of the loading hopper opposite the discharge tube thereof support the end of the loading hopper for rolling movement on the ground as the auger swings about the swing axis. To vary the distance of the loading hopper from the main conveyor tube in the lateral direction, the actuator 122 can be extended or retracted as shown in FIGS. 4 and 5. In this manner the loading hopper can be readily positioned in a variety of orientations about the swing axis and at different distances from the swing axis using the appropriate actuators to readily align the loading hopper with the discharge spout of a desired source of particulate material.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An agricultural conveyor assembly comprising:
a main conveyor comprising a main conveyor tube and a main conveying member in the main conveyor tube which is arranged to convey particulate material from an inlet end to an outlet end of the main conveyor tube;
a frame supporting the main conveyor tube at an upward incline from the inlet end to the outlet end in a working position of the main conveyor;
a loading hopper having a loading opening arranged to load the particulate material therein;
a swing auger assembly extending in a longitudinal direction from an inlet end in communication with the loading hopper so as to be arranged to receive the loaded particulate material from the loading hopper to an outlet end in communication with the inlet end of the main conveyor so as to be arranged to discharge the loaded particulate material into the inlet end of the main conveyor;
the swing auger assembly being pivotally coupled to the main conveyor such that the swing auger is pivotal relative to the main conveyor tube about a generally upright swing axis at the inlet end of the main conveyor;
a swing auger support member supported above the inlet end of the main conveyor;
a pivot member supported on the swing auger support member at a location spaced above the outlet end of the swing auger assembly for pivotal movement relative to swing auger support member about the swing axis; and
a suspension arm suspending the swing auger assembly from the pivot member for pivotal movement together with the pivot member about the swing axis.

2. The conveyor assembly according to claim 1 wherein the swing auger support member is arranged to be fixed relative to the main conveyor tube.

3. The conveyor assembly according to claim 1 wherein the swing auger support member supports the pivot member on the swing axis.

4. The conveyor assembly according to claim 1 wherein the swing auger support member extends upwardly from the main conveyor tube, and wherein the outlet end of the swing auger assembly is pivotally coupled to the main conveyor at a location spaced inwardly from the swing auger support member towards the outlet end of the main conveyor tube.

5. The conveyor assembly according to claim 1 wherein the swing auger support member comprises a lower portion extending upwardly from the conveyor tube spaced forwardly from the swing axis and an upper portion spaced above the discharge end of the swing auger assembly which extends rearwardly from the lower portion towards the outlet end of the main conveyor, the upper portion supporting the pivot member thereon at the swing axis.

6. The conveyor assembly according to claim 1 wherein the suspension arm comprises a linear actuator arranged to vary a height of the inlet end of the swing auger assembly as a length of the actuator is adjusted.

7. The conveyor assembly according to claim 1 wherein the suspension arm comprises a hydraulic lift actuator arranged to controllably vary a height of the inlet end of the swing auger assembly as a length of the actuator is adjusted in response to a hydraulic input.

8. The conveyor assembly according to claim 1 wherein the swing auger assembly comprises a first auger housing having a first screw therein to convey the particulate material from the loading hopper to a discharge end of the first auger tube and a second auger housing having a second screw therein to convey the particulate material from the discharge end of the first auger tube into the inlet end of the main conveyor, the first and second auger housings being coupled for relative sliding movement in the longitudinal direction to vary a length of the swing auger assembly, and the suspension arm being coupled between the pivot member and the second auger housing nearer to an inner end opposite the outlet end than the outlet end of the swing auger assembly.

9. The conveyor assembly according to claim 1 wherein the main conveyor tube includes an inlet opening arranged to receive the particulate material from the swing auger assembly therethrough at the inlet end of the main conveyor tube and wherein the swing auger assembly further comprises:
   an annular driven member supported about the inlet opening for rotation relative to the main conveyor about the swing axis together with the swing auger assembly; and
   a swing drive motor coupled to the annular driven member so as to be arranged to rotate the annular driven and the swing auger assembly therewith about the swing axis.

10. The conveyor assembly according to claim 9 wherein the swing drive motor is supported on the main conveyor spaced radially outward from the annular driven member in relation to the swing axis, and the annular driven member comprises a circumferential gear operatively connected to swing drive motor.

11. The conveyor assembly according to claim 9 wherein there is provided an inlet housing supported at the inlet end of the main conveyor having a top wall locating the inlet opening therein at swing axis, the annular driven member being supported within the inlet housing under the top wall of the inlet housing.

12. The conveyor assembly according to claim 9 wherein the swing auger assembly includes a pair of auger mounts extending upwardly from annular driven member at diametrically opposing sides of the inlet opening, the auger mounts pivotally coupling the discharge end of the swing auger assembly thereon for relative pivotal movement about a substantially horizontal axis.

13. An agricultural conveyor assembly comprising:
   a main conveyor comprising a main conveyor tube and a main conveying member in the main conveyor tube which is arranged to convey particulate material from an inlet end to an outlet end of the main conveyor tube;
   a frame supporting the main conveyor tube at an upward incline from the inlet end to the outlet end in a working position of the main conveyor;
   a loading hopper having a loading opening arranged to load the particulate material therein;
   a swing auger assembly extending in a longitudinal direction from an inlet end in communication with the loading hopper so as to be arranged to receive the loaded particulate material from the loading hopper to an outlet end in communication with the inlet end of the main conveyor so as to be arranged to discharge the loaded particulate material into the inlet end of the main conveyor;
   the swing auger assembly being pivotally coupled to the main conveyor such that the swing auger is pivotal relative to the main conveyor tube about a generally upright swing axis at the inlet end of the main conveyor;
   a swing auger support member supporting the swing auger assembly for pivotal movement about the swing axis through an intermediate position overtop of the main conveyor between a first offset position in which the swing auger assembly extends outwardly from one side of the main conveyor in a first lateral direction and a second offset position in which the swing auger assembly extend outwardly from the other side of the main conveyor in a second lateral direction opposite to the first lateral direction;
   the swing auger assembly extending from the discharge end at the inlet end of the main conveyor to the loading hopper towards the outlet end of the main conveyor in the intermediate position.

14. The conveyor assembly according to claim 13 wherein the swing auger assembly is arranged to be supported alongside top of main conveyor in the intermediate position such that longitudinal axes are substantially in common vertical plane.

15. The conveyor assembly according to claim 13 further comprising a hitch connector extending forwardly outward from the inlet end of the main conveyor opposite the outlet end of the main conveyer and a stop member arranged to prevent pivotal movement of the swing auger assembly across the hitch connector between the first and second offset positions.

16. An agricultural conveyor assembly comprising:
   a main conveyor comprising a main conveyor tube and a main conveying member in the main conveyor tube which is arranged to convey particulate material from an inlet end to an outlet end of the main conveyor tube;
   a frame supporting the main conveyor tube at an upward incline from the inlet end to the outlet end in a working position of the main conveyor;
   a loading hopper having a loading opening arranged to load the particulate material therein;
   a swing auger assembly extending in a longitudinal direction from an inlet end in communication with the loading hopper so as to be arranged to receive the loaded particulate material from the loading hopper to an outlet end in communication with the inlet end of the main conveyor so as to be arranged to discharge the loaded particulate material into the inlet end of the main conveyor;
      the swing auger assembly being pivotally coupled to the main conveyor such that the swing auger is pivotal relative to the main conveyor tube about a generally upright swing axis at the inlet end of the main conveyor; and the main conveyor tube including an inlet opening arranged to receive the particulate material from the swing auger assembly therethrough at the inlet end of the main conveyor tube;

an annular driven member supported about the inlet opening of the main conveyor tube for rotation relative to the main conveyor about the swing axis together with the swing auger assembly; and a swing drive motor connected to the annular driven member so as to be arranged to rotate the annular driven member and the swing auger assembly connected therewith about the swing axis.

* * * * *